May 11, 1965 H. K. LIGOTKY 3,183,365

ELECTRONIC COUNTER OR SCANNER USING MEMORY MEANS AND LOGIC GATES

Filed Oct. 15, 1959

INVENTOR.
H. K. LIGOTKY

BY [signature]
ATTORNEY

United States Patent Office 3,183,365
Patented May 11, 1965

3,183,365

ELECTRONIC COUNTER OR SCANNER USING MEMORY MEANS AND LOGIC GATE

Harri K. Ligotky, Chicago, Ill., assignor to International Telephone & Telegraph Corporation, New York, N.Y., a corporation of Maryland Filed Oct. 15, 1959, Ser. No. 846,730
3 Claims. (Cl. 307—88.5)

This invention relates to electronic logic circuits and more particularly to counters or scanners.

The logic of many electronic circuits requires sequential operations wherein devices may be controlled in an orderly manner to provide a progression of circuit functions extending from a start condition to a desired end condition in accordance with events which may or may not occur selectively during the various steps in the progression. A device which operates step-by-step to provide such a progression is a counting circuit that has as a primary function the receipt of information which is imparted in the form of pulses that may be generated either by the counting circuit itself or by an external control means. When a counter includes a free running pulse generator which operates on a self-controlled basis, uniform cyclically recurring pulses are provided to define time frames during which circuit operations may or may not occur—such a device is called a scanner. Another device is a driven counter wherein externally generated drive pulses cause the counter to advance step-by-step responsive to each drive pulse as it is received, thus registering a bit of information which is indicated by the total number of pulses that are received. Since a counter is a building block which finds many uses in logic circuitry, it is desirable to reduce the number of components and to provide greater flexibility whereby it may function in connection with many circuits and under many conditions.

An object of this invention is to provide new and improved counters and scanners.

Another object of this invention is to provide counters having a minimum number of components.

Yet another object of this invention is to provide counters having the flexibility which enables them to be used under a maximum number of conditions.

In accordance with this invention, a plurality of bistable circuits interact as a binary counter to provide a driving cycle having a particular number of steps. A like number of decimally related output circuits are connected to be operated responsive to each step in the cycle of the binary counter. Thereafter, the decimally related output circuits may either recycle or additional output circuits may be driven by the binary counter through a similar cycle to provide greater capacity.

The above mentioned and other objects of this invention together with the manner of obtaining them will become more apparent and the invention itself will be best understood by making reference to the following description of an embodiment of the invention taken in conjunction with the accompanying drawings in which:

FIG. 1 discloses a scanner circuit driven by a free running pulse generator;

FIG. 2 explains the symbols which identify the logic circuitry that is used in the detailed drawings of FIG. 1;

Figure 2:
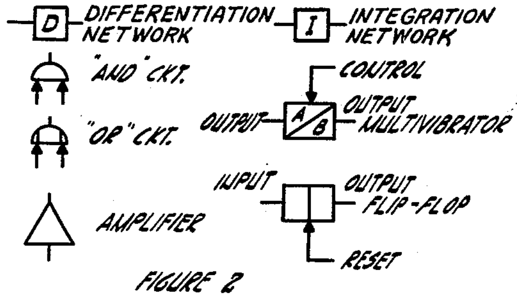

Referring first to FIG. 2, and "AND" circuit (which conducts only when all input terminals thereof are energized simultaneously) is shown by a semi-circle having input conductors marked by arrowheads touching the chord.

An "OR" circuit (which conducts if any of the input terminals is marked) is shown as a semi-circle having input conductors shown as lines which bisect the semicircle with the input conductors being designated by arrowheads.

An amplifier is shown by a small triangle.

A bistable or multivibrator circuit is shown by a rectangle having a diagonal line. When side A is turned-on, side B is turned-off and vice versa—thereby providing two alternately effective output signals which are transmitted over the conductors marked "OUTPUT." If the multivibrator is free running, conductivity in one side automatically turns-on the non-conductive side and turns-off the conductive side. On the other hand, the circuit may also be a bistable element wherein a first side conducts responsive to a first input signal on the control conductor. When a second input signal is received over the control conductor the first side is rendered non-conductive and the second side is rendered conductive.

A flip-flop or memory device is shown by a rectangle having a central bisecting line which is designated "RESET." Normally, a flip-flop is in a first stable state of nonconductivity until a signal is applied to an input terminal at which time the flip-flop turns-on to provide a signal on the output conductor, thereby remembering the input signal. When a signal is applied to the reset conductor (marked by an arrowhead), the flip-flop is turned-off, thereby forgetting the input signal and remembering the reset signal.

A differentiation network (shown by a block including the letter "D") provides spikes at leading and trailing edges of pulses and an integration network (shown by a block including the letter "I") delays a pulse by a predetermined time period.

In accordance with this invention, a circuit may operate either as a counter or as a scanner depending upon whether item 18 is a free running pulse generator or a bistable circuit. Item 18A (FIG. 3) is a bistable circuit, wherein a first drive pulse is applied at terminal 75 to turn-on side A and cause a marking pulse to be applied to conductor 16A. A second drive pulse applied at terminal 75 turns-off side A and turns-on side B thereby causing a marking pulse to be applied to conductor 17A. A third pulse turns-off side B and turns-on side A thereby remarking conductor 16A. In a similar manner, each ensuing drive pulse applied at terminal 75 switches the output of circuit 18A between conductors 16A and 17A. On the other hand, item 18 (FIG. 1) is a free running multivibrator or pulse generator so that each of the conductors 16 and 17 is marked for uniform periods of time during alternate half-cycles. If bistable circuit 18A is used, the device functions as a counter—if free running multivibrator 18 is used, the device functions as a scanner.

Briefly, a scanning or counting drive cycle is generated under the influence of a binary counter which provides a four step cycle responsive to the interaction of multivibrators or bistable circuits 15 and 18, i.e. on a first step side A of multivibrator 18 conducts to pulse conductor 16 thus switching bistable circuit 15 so that side B conducts to mark conductor 14, on a second step multivibrator 18 switches to its side B and pulses conductor 17, on a third step multivibrator 18 switches to its side A and pulses conductor 16 to switch bistable circuit 15 so that side A conducts to mark conductor 13, and on a fourth step multivibrator 18 switches to side B to pulse conductor 17. After the binary counter has counted four steps, the cycle is repeated. A plurality of decimally related output circuits including AND gates such as 22, 23, 26 and 27 are arranged to conduct sequentially in accordance with the four step cycle, i.e. AND gate 22 conducts on step one, AND gate 23 conducts during the second step, on the third step bistable circuit 15 pulses conductor 13 to turn-off flip-flop 51 and turn-on flip-flop 53, thus advancing a chain of memory devices to turn-on AND gate 26 and prepare AND gate 27, and on the fourth and final step AND gate 27 conducts. During the next four step drive cycle AND gates 30, 31, 34 and 35 conduct in sequence. It should be obvious that as many four gate output chains may be provided as may be required for a given operation. After all of the output circuits have been pulsed, the chain recycles responsive to signals returned over strap 84.

In greater detail, means is provided for starting a scan cycle when a pulse is applied to terminal 70. Responsive thereto, an input terminal is marked at each of the OR gates 62–67. When OR gates 62–66 conduct, individually associated reset terminals of a multi-stage chain of memory devices (i.e. flip-flop circuits 51, 53, 55, 57 and 59) are marked to be sure that each is in a normal or non-conductive state. When OR gate 67 conducts an input signal applied to flip-flop 61 causes a potential to be extended from the output terminal thereof to group-mark one input terminal of each of the AND gates 40 and 41, and further to mark one input terminal of AND gate 50 via strap 84, thus preparing the next stage in the chain of memory circuits.

Means is provided for energizing a first output circuit responsive jointly to the group marking extended from the last stage memory device 61 to the right-hand input terminals of gates 40 and 41 and to the individual marking extended from pulse generator 18 to a left-hand input terminal of either AND gate 40 or 41. In greater detail, the next circuit operation depends upon the condition of free running multivibrator 18 at the time being described. For example, if it is assumed that side B of free running multivibrator 18 is turned-on, a second input terminal of AND gate 41 is marked on an individual basis, thus causing a signal to be extended through amplifier 42 to terminal 12. Therefore, scanning starts with terminal 12. After a brief period of time, free running multivibrator 18 switches and its side A conducts thereby marking conductor 16. Responsive thereto, side B of bistable circuit 15 applies a potential to conductor 14, thus marking the lower input terminal of AND gate 50. Since flip-flop 61 is conducting at this time, the upper input terminal of AND gate 50 is also marked; hence, gate 50 conducts and flip-flop 51 turns-on, thereby advancing the chain of memory circuits.

Responsive to the output of flip-flop 51, a signal is extended through OR gate 68 to reset flip-flop 61, thus terminating the signal applied to the right-hand input terminals of AND gates 40 and 41 and removing the pulse from terminal 12. The marking is removed from the upper input terminals of AND gate 50, which turns-off. Also responsive to the output of flip-flop 51, the right-hand terminals of AND gates 22 and 23 are group marked.

Side A of free running multivibrator 18 is conductive; therefore, a potential applied via conductor 16 marks the left-hand terminal of AND gate 22. Since both input terminals of AND gate 22 are being pulsed simultaneously, there is an output signal which is applied to terminal 1 via amplifier 21.

After a brief period of time, bistable multivibrator 18 switches from a first stable condition when side A conducts to a second stable condition when side B conducts, thereby removing a potential from conductor 16 and applying a potential to conductor 17. The decimal output circuit including AND gate 22 ceases to conduct while the output circuit including AND gate 23 begins to conduct responsive to a coincidence of signals applied via conductor 17 and signals applied from the output of the first stage memory device or flip-flop 51. The output signal from AND gate 23 is amplified by item 24, thus marking terminal 2.

Means is provided for advancing the memory chain to the next stage responsive to the binary counter operation of circuits 15 and 18. That is, when free running multivibrator 18 switches again, side B becomes non-conductive and side A becomes conductive, thereby removing a potential from conductor 17 and applying a potential to conductor 16. The potential on conductor 16 causes bistable circuit 15 to switch from its B to its A side, thereby removing a marking from conductor 14 and applying a marking to conductor 13. Responsive thereto, the lower input terminal of AND gate 52 is marked. Since flip-flop 51 has been triggered to its conductive state, the upper input terminal of AND gate 52 is also marked. Therefore, a signal is transmitted to turn-on flip-flop 53 and thus advance the memory chain.

Responsive to the output of flip-flop 53, a potential is returned through OR gate 62 to reset flip-flop 51 and is applied to the right-hand terminals of AND gates 26 and 27. Since side A of free running multivibrator 18 is now conducting, a signal is applied via conductor 16 to the left-hand input terminal of AND gate 26. Output terminal 3 is marked responsive to the coincidence of signals at the input terminals of AND gate 26.

In a similar manner, each of the remaining output terminals 4–12 is marked in sequential order. In the embodiment shown in FIG. 1, after terminal 12 is marked, a signal is returned via strap 84 (as explained above) to cause AND gate 50 to conduct thereby recycling the scanning process which continues until energization of pulse leads 16 and 17 stops, i.e. free running multivibrator 18 is turned-off.

The principles of the invention have been described above in connection with a scanner which is driven by a free running pulse generator or multivibrator 18. However, it should be understood that the circuit operates equally well as a counter if free running multivibrator 18 is replaced by the bistable circuit 18A of FIG. 3, if the start terminal 70 is connected with an input terminal of OR gate 68 to reset instead of turn-on flip-flop 61, and if start terminal 70 is connected to the input of flip-flop circuit 51 instead of an input of OR gate 62. Conductors 16A and 17A are connected to conductors 16 and 17 respectively. After these substitutions and modifications are made, there is only one significant change which is different from the operation explained above. That is, the normal or pre-existing state of circuit 18A is known. Therefore, the first drive pulse that is applied at terminal 75 triggers bistable circuit 18A so that its side A conducts to mark conductor 16A and turn-on AND gate 22. Thereafter, each drive pulse causes bistable circuit 18A to switch sides, thus producing the results that were described above in connection with the automatic shifting by free running multivibrator 18.

Figures 1, 3:
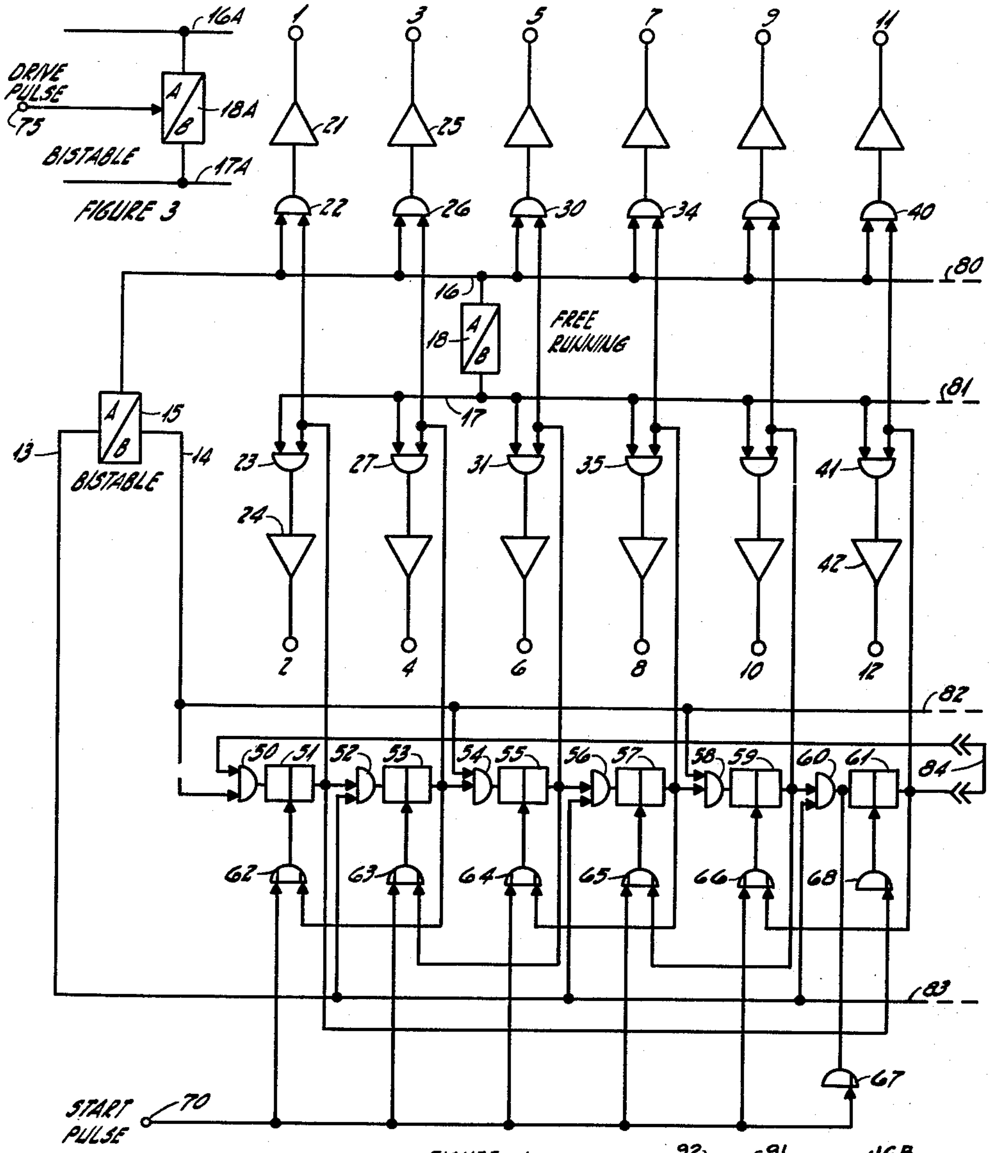
FIG. 3 shows a modification for providing a pulse driven counter.
Figure 4:
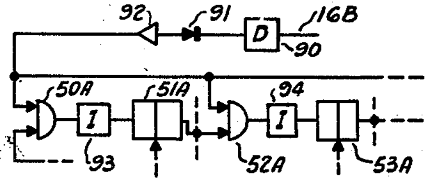
FIG. 4 shows another version of a scanner or counter.

In FIG. 1, the binary counter is shown as having two stages (items 15 and 18) which develop a four step drive cycle, thereby controlling a decimal output chain that counts in multiples of four, i.e. there may be 4, 8, 12, 16, etc. output terminals. Actually, the binary counter may be modified to provide a drive cycle having any suitable number of steps. For example, the numeral ten is not a multiple of four; therefore, the embodiment of FIG. 1 may not be the most economical chain if only ten decimally related steps are required. FIG. 4 shows a modification which provides a two step binary counter that may be used to drive a counting chain in multiples of two, i.e. there may be 2, 4, 6, 8, 10, etc. output terminals.

Either the free running scanner of FIG. 1, or the driven counter of FIG. 3 may be modified by deleting bistable circuit 15 and substituting therefor a differentiation network 90, diode 91 and amplifier 92. Conductor 16B (FIG. 4) connects directly to conductor 16 (FIG. 1). The memory chain is also modified by providing integration or time delay networks 93, 94, etc. between each memory stage to prevent operation of two or more memory stages responsive to one drive pulse. The time delay introduced by each integration network is longer than one-half of but shorter than the entire duration of a differentiated drive pulse or spike emanating from circuit 90. Except for the changes noted, the modified circuit of FIG. 4 is identical to the circuits of FIG. 1 or 3.

The circuit of FIG. 4 functions in the following manner: Either free running pulse generator 18 or driven bistable circuit 18A is operated through two steps to mark conductors 16B and 17 alternately. On each second step, the pulse appearing on conductor 16B is differentiated by network 90 to provide positive going and negative going spikes which occur at the two edges thereof. Diode 91 passes only one polarity of the spikes which are amplified at 92. The amplified spike that is passed by diode 91 is applied at the upper input terminal of AND gates 50A, 52A and all other AND gates (not shown) in the memory chain. The lower input terminal of each AND gate 50A, 52A, etc. is marked by the preceding stage when in an "on" condition. For example, as explained above, flip-flop 61 (FIG. 1) is turned-on responsive to a start pulse. The output of flip-flop 61 is applied to the lower input terminal of AND gate 50A (FIG. 4) which conducts when the differentiated spike is applied to the upper input terminal thereof by amplifier 92. The output of AND gate 50A is delayed in network 93 for a period of time. Thereafter flip-flop 51A turns-on and maks the lower input terminal of AND gate 52A; however, AND gate 52A does not turn-on at this time because the delay in circuit 93 prevents energization of the lower input terminal of AND gate 52A until after the differentiated spike applied to the upper input terminal thereof has terminated. The output of flip-flop 51A also resets the preceding stage in the memory chain and marks one input terminal at each of the AND gates 22 and 23 (FIG. 1).

Responsive to the second differentiated spike emanating from circuit 90 (FIG. 4), AND gate 52A conducts. After a time delay which is adequate to prevent a substantially simultaneous firing of two or more stages in the memory chain, flip-flop 53A turns-on to prepare the next memory stage, to reset flip-flop 51A and to mark one terminal on each of the AND gates 26 and 27.

Hence, it is seen that the binary counter may be modified to provide a drive cycle having any number of steps and that the number of output stages in the decimal chain is adjusted to correspond with the number of steps in a binary counting cycle. Moreover, the decimal chain may be duplicated to provide a units chain, a tens chain, a hundreds chain, etc.

While the principles of the invention have been described above in connection with specific apparatus, it is to be clearly understood that this description is made only by way of example and not as a limitation to the scope of the invention.

I claim:

1. A scanning or counting device for sequentially marking a plurality of decimally numbered output means comprising a plurality of "AND" gates having only first and second inputs, a first group of said "AND" gates, means connecting one of each of said "AND" gates of said first group to the odd numbered output means, a second group of said "AND" gates, means connecting one of each of said "AND" gates of said second group to the even numbered output means, a first and a second bistable multivibrator means, each alternately providing either of two stable output signals, means responsive to successive output signals of said first bistable multivibrator means for alternately group marking said first input of every "AND" gate in each of said groups, a multistage chain of memory means, each stage of said memory means being individually, simultaneously associated with one of said second inputs of said "AND" gates in said first group and one of said second inputs of said "AND" gates in said second group, means responsive to said output signals of said second bistable multivibrator means for stepping said multistage chain of memory means in stage-by-stage sequence for simultaneously marking the second input of successive ones of said "AND" gates in said first group and the second input of the successive ones of said "AND" gates in said second group, and means responsive to every second output signal from said first bistable multivibrator means for switching the second bistable multivibrator means from one stable output condition to another stable output condition to step said multistage chain of memory means.

2. The device of claim 1 wherein said first bistable means comprises a free running multivibrator.

3. The device of claim 1 wherein said first bistable means comprises means which is operated to provide said output signals responsive to externally applied drive pulses.

References Cited by the Examiner

UNITED STATES PATENTS

| | | | |
|---|---|---|---|
| 2,787,416 | 4/57 | Hansen | 340—174 |
| 2,825,889 | 3/58 | Henle | 307—88.5 |
| 2,827,233 | 3/58 | Johnson et al. | 307—88.5 |
| 2,906,892 | 9/59 | Jones | 307—88.5 |
| 2,919,308 | 12/59 | Cooke | 328—103 |
| 2,938,193 | 5/60 | Eckert | 340—168 |
| 2,945,183 | 7/60 | Hartke et al. | 328—48 |
| 2,956,180 | 10/60 | James | 307—88.5 |
| 2,964,657 | 12/60 | Page | 307—88.9 |
| 3,052,871 | 9/62 | Brinster et al. | 307—88.9 |

JOHN W. HUCKERT, *Primary Examiner.*

IRVING L. SRAGOW, *Examiner.*